United States Patent [19]

Kawashima et al.

[11] 4,398,875
[45] Aug. 16, 1983

[54] MOLDING TOOL FOR FORMING A CLOSURE SHELL LINER

[75] Inventors: Masayoshi Kawashima, Ibaragi; Akio Yuasa, Toyonaka, both of Japan

[73] Assignee: Toyo Seikan Kaisha, Ltd., Tokyo, Japan

[21] Appl. No.: 256,156

[22] Filed: Apr. 21, 1981

[30] Foreign Application Priority Data

Apr. 28, 1980 [JP] Japan .................................. 55-55387

[51] Int. Cl.³ .............................................. B29C 3/00
[52] U.S. Cl. .................................... 425/127; 264/268; 425/809
[58] Field of Search ............... 425/123, 127, 412, 809, 425/393; 264/268

[56] References Cited

U.S. PATENT DOCUMENTS

| | | | |
|---|---|---|---|
| 945,357 | 1/1910 | Wilzin | 425/809 |
| 1,989,725 | 2/1935 | Villanyi | 425/809 |
| 3,004,297 | 10/1961 | Stover | 425/809 |
| 3,547,746 | 12/1970 | Gwinner | 264/268 |
| 3,828,963 | 8/1974 | Moller | 264/268 |
| 3,950,119 | 4/1976 | Reicheubach | 425/127 |
| 3,958,910 | 5/1976 | Wilde | 425/809 |
| 4,274,822 | 6/1981 | Tamai et al. | 425/127 |
| 4,312,824 | 1/1982 | Mori et al. | 425/809 |

FOREIGN PATENT DOCUMENTS

| | | | |
|---|---|---|---|
| 177081 | 5/1953 | Austria. | |
| 2307593 | 12/1976 | France. | |
| 53-126067 | 11/1978 | Japan | 264/268 |
| 144178 | 12/1968 | Spain. | |
| 379912 | 12/1981 | Spain. | |
| 1080654 | 8/1967 | United Kingdom. | |
| 1369415 | 10/1974 | United Kingdom. | |
| 2022063 | 12/1979 | United Kingdom | 425/809 |

*Primary Examiner*—Jay H. Woo
*Attorney, Agent, or Firm*—Pennie & Edmonds

[57] ABSTRACT

A molding tool for forming a closure shell liner on the inside surface of a closure shell having a skirt with a groove therein. The tool has a central molding member and a shell positioning sleeve concentric with and external of the central member with the sleeve having an upper portion adapted to be positioned opposite the groove in the skirt of the shell and a lower portion extending to the lower end of the sleeve. The outer diameter of the upper portion of the sleeve exceeds the outer diameter of the lower portion by an amount equal to twice the depth of the groove.

2 Claims, 6 Drawing Figures

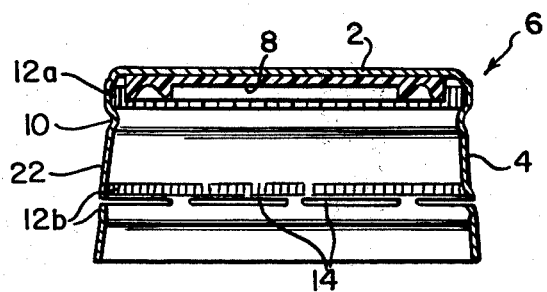
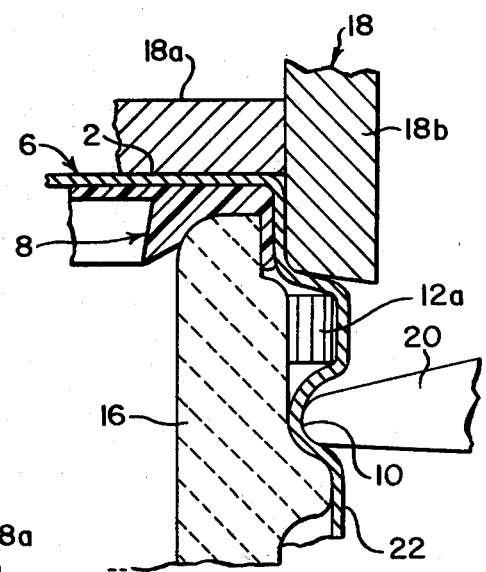
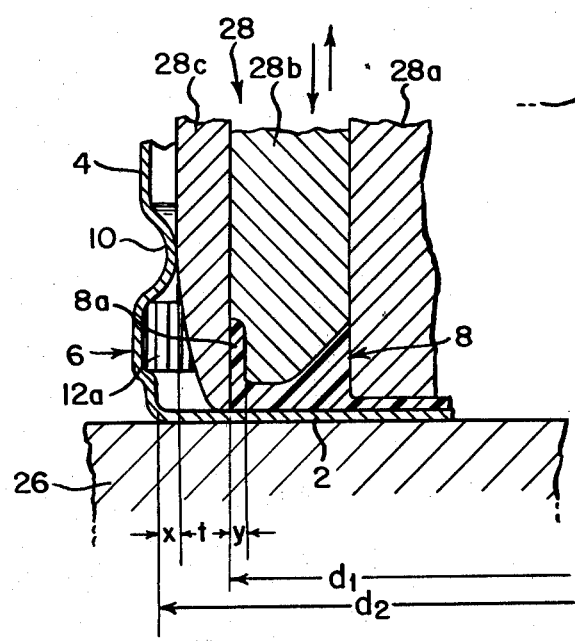

MOLDING TOOL FOR FORMING A CLOSURE SHELL LINER

TECHNICAL FIELD

This invention relates to a molding tool for forming a liner on the inside of a top panel of a closure shell adapted to be applied to a container. More specifically, the invention pertains to a molding tool comprising a central molding member and a closure positioning sleeve disposed externally of the central molding member and adapted for forming a liner on the inside of a circular top panel of a closure shell and where the shell comprises the circular top panel, a cylindrical skirt extending downwardly from the peripheral edge of the top panel, and a circumferentially extending annular groove formed in the upper portion of the skirt.

BACKGROUND ART

Closures comprising metallic shells having circular top panels and cylindrical skirts extending downwardly from the peripheral edges of the top panels and molded liners disposed on the inside of the panels have gained widespread acceptance for use with containers, such as bottles, having a threaded peripheral surface at their neck portion. It is important that in such closures, a circumferentially extending annular groove should be formed at a specified point in the upper portion of the skirt of the shell, as will be explained below with reference to the drawings.

Generally, the container closures are produced by fabricating a shell of a desired shape, supplying a liner material to the inside of a top panel portion of the shell and molding the liner material. Molding of the liner material is effected by placing an inverted shell on an anvil and where the liner material has been previously supplied to the inside of its top panel. A molding tool is then lowered in a perpendicular direction into the shell.

A molding tool that is widely used comprises a central molding member composed of a center punch, an annular bushing and a shell positioning sleeve disposed externally of the central molding member, all as disclosed, for example, in Japanese Laid-Open Patent Publication No. 65184/1978. Such a conventional molding tool, however, gives rise to various problems as will be described in detail hereinbelow with reference to the accompanying drawings. For example, the positioning action of the positioning sleeve upon the shell is too slow. Moreover, the positioning sleeve is likely to contact or abut the annular groove of the shell to cause undesirable deformation of the annular groove and often the liner material cannot be molded into the desired shape.

DISCLOSURE OF INVENTION

It is an object of this invention to provide a molding tool which overcomes the aforesaid problems associated with the use of a conventional molding tool.

Broadly we propose using a shell positioning external sleeve the outside diameter of which at a lower portion extending from its lower end to an area which faces the annular groove in a container closure shell when the molding tool has been inserted into the closure shell corresponds generally to the inner diameter of the groove and where the outer diameter of the sleeve at an upper portion corresponds generally to the inside diameter of the open end of the cylindrical skirt of the shell.

According to the invention, there is provided a molding tool for forming a liner on the inside of a circular top panel of a closure shell where the shell comprises a circular top panel, a cylindrical skirt extending downwardly from the peripheral edge of the top panel and a circumferentially extending annular groove formed in the upper portion of the skirt. The molding tool has a central molding member and a shell positioning sleeve disposed externally of the central molding member. The sleeve has an upper portion extending downwardly to a point which faces or is opposite to the groove when the tool is inserted into the shell and a lower portion extending downwardly from the point to the end of the sleeve. The other diameter of the upper portion exceeds that of the lower portion by an amount equal to twice the radial depth of the groove.

BRIEF DESCRIPTION OF THE DRAWINGS

FIG. 1 is a sectional view showing one example of a closure shell provided with a molded liner applied to a container;

FIG. 2 is a partial sectional view illustrating the function of an annular groove formed in the skirt of a container closure shell in guiding a threading roller to produce threads in a closure shell;

FIG. 3 is a partial sectional view of a prior art molding tool for forming a liner.

DESCRIPTION OF THE PREFERRED EMBODIMENT

Figure 4:
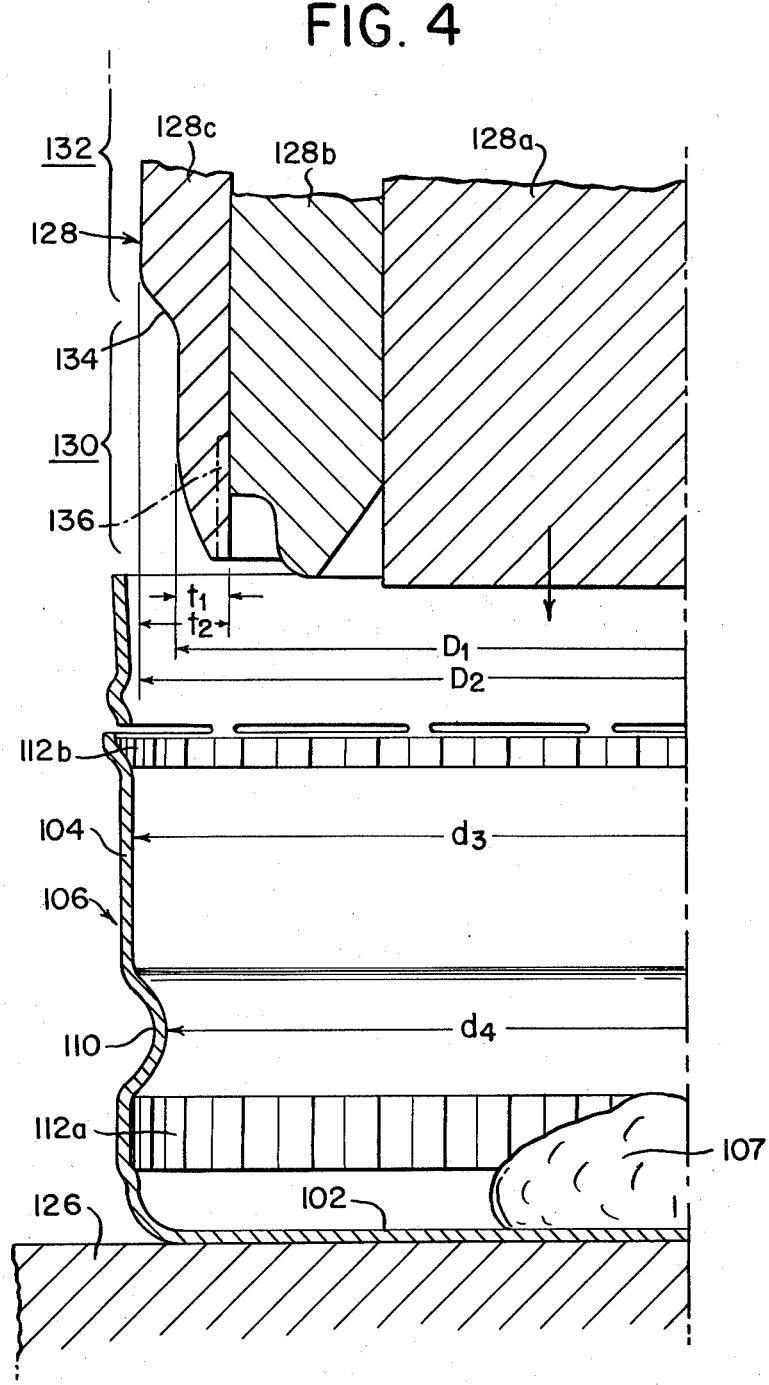
FIGS. 4 to 6 are partial sectional views showing the construction and stages of operation of an embodiment of a molding tool according to the invention.

For a better understanding of the present invention, the configuration of a container closure and a conventional molding tool for molding a liner material in the closure are discussed at some length before going into a detailed description of the preferred embodiment of the molding tool of this invention.

Referring to FIG. 1, a closure for a container, such as a bottle, having a threaded peripheral surface at its neck portion is illustrated where the closure comprises a metallic shell 6 having a circular top panel 2, a cylindrical skirt 4 extending downwardly from the peripheral edge of the panel 2 and a molded liner 8 disposed on the inside of the top panel 2. It is important in such a closure that a circumferentially extending annular groove 10 be formed at a specified area in the upper portion of the skirt 4 of the shell 6. In many cases, the skirt 4 may have an upper knurl portion 12a and a lower knurl portion 12b for preventing finger slip when removing the closure from the neck portion of the container. Further the closure may include a plurality of slits 14 formed circumferentially in spaced-apart relation to render the closure pilfer-proof. These two features however are not essential.

The function of the annular groove 10 is as follows. When the closure is to be sealed about the neck portion of a container, it is the general practice to fit the closure over the neck portion 16 of the container and then deform the shoulder of the shell (the boundary portion between the top panel 2 and the skirt 4) by using a pressing tool 18 having a deforming portion 18b while at the same time pressing the top panel 2 of the shell 6 against the end portion of the neck 16 by the pressing portion 18a of the pressing tool 18 via the liner 8. A thread-forming part 22 of the skirt 4 is then threadably deformed along the thread existing on the outside surface of the neck portion 16 of the container by a threading roller 20. The annular groove 10 is so designed that it guides the threading roller 20 to the predetermined area 22 of the skirt 4 where the threads in the skirt are initially formed.

Generally, a closure having the configuration shown in FIG. 1 is produced by the following procedure. First, a substantially cup-like shell 6 having a circular top panel 2 and a cylindrical skirt 4 extending downwardly from the peripheral edge of the top panel 2 is fabricated from a suitable metal blank by press-forming, drawing, etc. Then, by using a suitable device similar to that disclosed, for example, in Japanese Patent Publication No. 14396/1970, knurls 12a and 12b, slits 14 and other elements are formed in the skirt 4 of the shell 6 and a circumferentially extending annular groove 10 is also formed. Then, a suitable liner material is fed to the inside of the top panel portion of the shell 6 and molded to form a liner therein of a predetermined shape.

In molding the liner material in the procedure outlined above, it is generally necessary to place the shell 6 on a suitable anvil 26 in an inverted state (i.e., in a state in which the top panel 2 is located on anvil 26 and the skirt extends perpendicularly upwardly). A molding tool is then moved downwardly in the perpendicular direction to the shell 6 where it is inserted into the shell 6 to thus mold the liner material into a liner 8 of the desired shape.

In view of the sealing characteristics of an opening portion of a container sealed by the closure, it is important that the liner 8 should have a specified shape such as that disclosed in detail in the above-cited Japanese Laid-Open Patent Publication No. 65184/1978. In order to form such a liner, a molding tool 28 is generally used which is provided with a central molding member consisting of a center punch 28a, an annular bushing 28b and a shell positioning sleeve 28c disposed externally thereof as also disclosed in Japanese Laid-Open Patent Publication No. 65184/1978. The external peripheral surface of the sleeve 28c contacts the inside of the annular groove 10 of the skirt 4 thereby positioning the shell 6 such that the central axial line of the molding tool 28 is in alignment with that of the shell 6. The lower end surface of the sleeve 28c contacts the inside of the top panel of the shell 6 to thereby define the outside diameter of the liner 8 to be formed, and to prevent the liner material from flowing and rising along the skirt 4.

The use of the molding tool 28 as shown in FIG. 3 is, however, not entirely satisfactory. This is because the shell positioning sleeve 29c does not begin to exert a positioning action on the shell 6 until the molding tool 28 has been inserted into the shell 6 to such an extent that the lower end of the sleeve 28c contacts the annular groove 10 formed in the skirt 4. Frequently application of the positioning action at this point is too late. For example, if the molding tool 28 is of the type in which the end of the center punch or central molding member 28a projects beyond the end of the sleeve 28c, the center punch 28a will have descended to the position shown in FIG. 3 to contact the liner material to be molded prior to the end of the sleeve 28c engaging the inner surface of the groove to position the shell.

Furthermore, the positioning action of the sleeve 28c is performed by the abutting or contacting of the lower end portion of the sleeve 28c with the inside surface of the annular groove 10 However, this action often causes undesirable deformation to the annular groove 10.

The conventional molding tool 28 also has the following problem or defect. Specifically, in the molded liner 8 as shown in FIG. 3, it is desirable that the outside diameter $d_1$ of the liner 8 should be close as possible to the inside diameter $d_2$ of the top panel of the shell. The outside diameter $d_1$ of the liner 8 is necessarily smaller than the inside diameter $d_2$ of the top panel of the shell 6 by the depth x of the annular groove 10 formed in the skirt 4 (i.e., the amount of radially inward projection) and the thickness of the sleeve 28c (namely, $d_2 - d_1/2 = x + t$). The depth x of the annular groove 20 is generally about 0.5 mm, and the thickness 28c is generally at least 0.8 mm. Accordingly, $d_2 - d_1/2$ is generally at least 1.3 mm. In this case, the thickness of an external wall surface portion 8a of the liner 8 becomes quite small. It has been found that when the thickness y of the outside wall surface portion 8a of the liner 8 is quite small, the outside wall surface portion 8a of the liner may be easily broken when, for example, an impact force is exerted on the shoulder of a closure after the closure has been sealed about the neck portion 16 of a container. This will give rise to a serious problem in that the sealing of the opening portion of the container is destroyed.

In order to avoid this problem, the $d_2 - d_1$ value should be minimized. This can be accomplished by decreasing the depth x of the annular groove 10 and/or decreasing the thickness t of the sleeve 28c. If the depth x of the annular groove 10 is made too small, it is impossible to accurately guide the threading roller 20 to a predetermined position of the skirt 4 at the time the closure is sealed to the neck portion 6 of the container. Consequently, it is extremely difficult to deform the thread-forming part 22 of the skirt as required and the closure presents a poor appearance. On the other hand, if the thickness t of the sleeve 28c is simply decreased, its strength will be reduced and the sleeve 28c may be broken within a relatively short period of time due to wear and tear.

Referring to FIG. 4 there is illustrated a molding tool constructed according to the invention where a closure shell 106 is conveyed by a suitable conveying mechanism (not shown) to a substantially flat top surface of an anvil 126 and placed thereon in an inverted state. The shell 106 may be of the same form as the shell 6 illustrated in FIG. 1, however it is important that the inside of the top panel 2 should contain a liner material 107 of a suitable plastic material such as a polyolefin (e.g. polyethylene) or a vinyl chloride resin supplied thereto.

Figure 6:
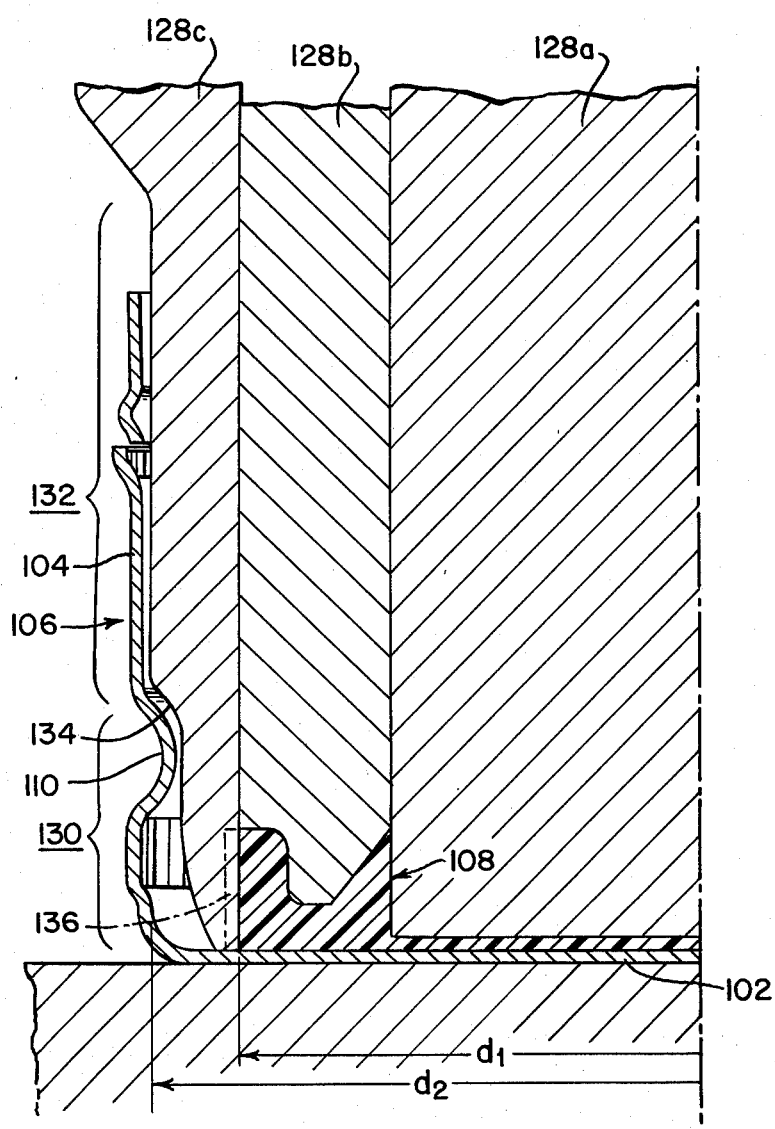

The molding tool 128 is disposed above the anvil 126, and, as will be described in detail hereinbelow, is adapted to descend by a suitable elevator mechanism (not shown) to be inserted into the shell 106 thereby molding the liner material 107 into a liner 108 of the desired shaped as shown in FIG. 6.

The illustrated molding tool 128 has a central molding member consisting of a center punch 128a, an annular bushing 128b disposed externally of the center punch 128a, and a shell positioning external sleeve 128c disposed externally of the annular bushing 128b. In the illustrated embodiment, the center punch 128a and the annular bushing 128b of the central molding member comprise separate units but if desired, they may be formed as an integral one-piece unit. The means operatively connecting the elements comprising the molding tool 128, that is, the center punch 128a, annular bushing 128b and position-setting external sleeve 128c, and means mounting them to an elevator mechanism (not shown) are conventional. Accordingly, a description of such structure is omitted in the present application, and for details, reference may be made, for example, to the specification and drawings of U.S. Pat. No. 3,278,985.

It is important that the shapes of the undersurfaces of the center punch 128a and annular bushing 128b of the molding tool 128 should correspond to the desired shape of the liner 108 formed by the molding operation as shown in FIG. 6.

Figure 5:
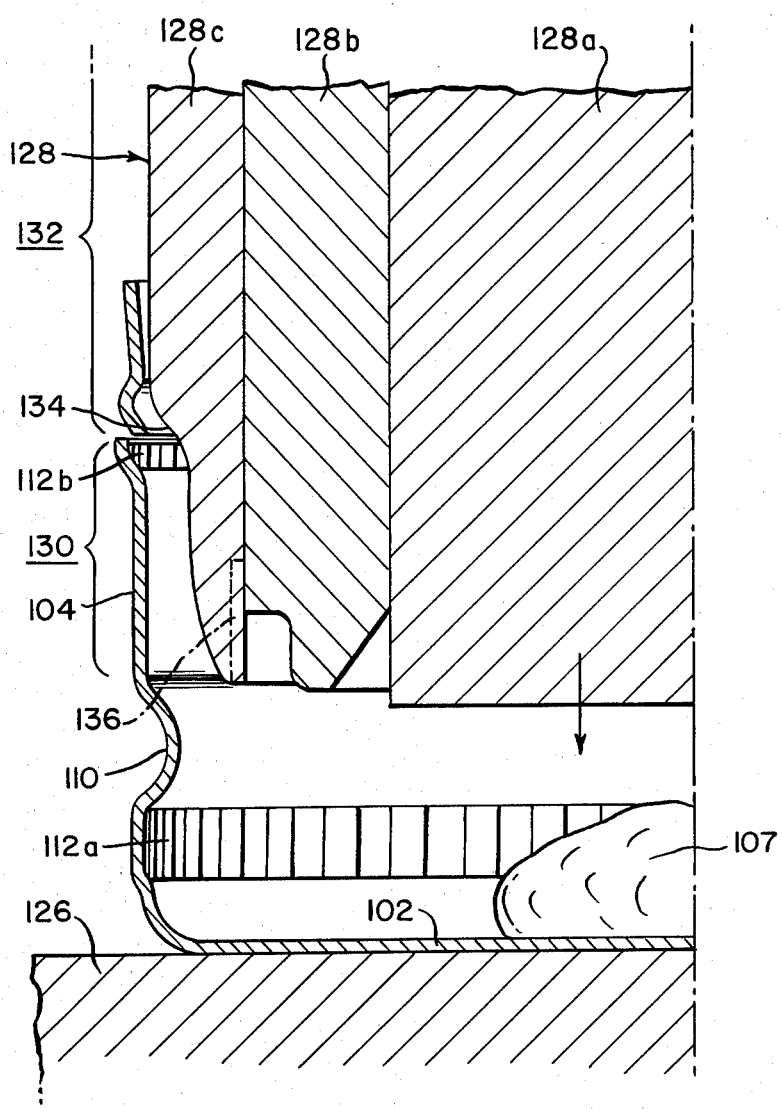

The shell positioning external sleeve 128c, on the other hand, should be in the form described below. It is important, as shown in FIGS. 4-6, that the thickness $t_1$ at the lower end portion 130 of the positioning sleeve 128c should be smaller than the thickness $t_2$ of the sleeve at an upper portion 132 by an amount equal substantially to the radial depth of the groove 110 of the shell 106. This results in the outer diameter $D_1$ of the lower portion 130 of the sleeve being less than the outer diameter $D_2$ of the upper portion 132 of the sleeve by an amount equal substantially to twice the radial depth of the groove 110. It is also important that the lower portion 130 having the smaller outside diameter $D_1$ should extend from its lower end upwardly to that point which faces the annular groove 110 of the closure shell 106 when the positioning sleeve 128c has been inserted into the inside of the shell 106 where its lower end abuts the inside of the top panel 102 of the shell 106 as shown in FIG. 6. The external surface of the end of the lower portion 130 of the shell positioning sleeve 128c can be tapered as shown in FIGS. 4 to 6.

On the other hand, the upper portion 132 of the positioning sleeve 128c preferably has a tapered portion 134 with a progressively increasing outside diameter going upwardly from the outside diameter $D_1$ of the lower portion 130 to the outside diameter $D_2$ of the upper portion 132. It is important that the outside diameter $D_2$ of the upper portion of the positioning sleeve 128c should correspond to the inside diameter $d_3$ of that portion of the skirt 104 of the closure shell 106 which is located on the opening end side above the annular groove 110 as shown in FIG. 4.

Preferably, the outside diameter $D_1$ of the lower portion 130 of the sleeve 128c is generally set, with respect to the inside diameter $d_4$ of the skirt 104 at the groove 110, such that $d_4 - D_1 \geq 0.10$ mm to provide a working clearance between the sleeve and the groove $\leq 0.05$ mm and more particularly that $d_4 - D_1 \leq 0.20$ mm to provide a working clearance of $\geq 0.10$ mm. However, if the working clearance is made too large by decreasing $D_1$, then the thickness $t_1$ will become excessively small reducing the strength of the sleeve 128c at the lower region 130 below an acceptable level. With this in mind, the upper limits of $d_4 - D_1 \leq 0.40$ mm such that the maximum working clearance should be $\leq 0.20$ mm.

It is also preferred that the outside diameter $D_2$ of the upper region 132 of the sleeve 128c should be set with respect to the inside diameter $d_3$ of the skirt 104 such that $d_3 - D_2 \geq 0.10$ mm to provide a working clearance of 0.05 mm between the skirt 104 and the sleeve and more particularly $d_3 - D_2 \leq 0.20$ mm to provide a working clearance $\geq 0.10$ mm.

The inside diameter of the shell positioning sleeve 128c should be as large as possible if it is desired to have the diameter $d_1$ of the liner 108 as shown in FIG. 6 approach the inside diametere $d_2$ of the top panel of the shell 106 as closely as possible. However, increasing the inside diameter of the sleeve 128c results in a decrease in thickness of the sleeve and consequently its strength. In view of this, it is desirable that the thickness $t_1$ of the sleeve 128c at the lower portion be at least 0.45 mm and its thickness $t_2$ at its upper portion 132 be at least 0.50 mm.

If desired, an annular recess 136 may be formed on the inside surface of the end of the sleeve 128c as shown by the dotted lines in FIGS. 4 to 6 in order to maximize the thickness $t_2$ of the sleeve at the upper region 132. The thickness $t_1$ of most of the lower region 130 remains the same thereby making the strength of the sleeve 128c sufficiently strong while allowing the outside diameter $d_1$ of the liner 108 to approach as close as possible the inside diameter $d_2$ of the top panel of the shell.

The external shell positioning sleeve 128c of the configuration described above may be made of a suitable material such as SKD tool steel or SKS tool steel.

The operation of the molding tool 128 having the improved external shell positioning sleeve 128c is as follows. A liner material 107 is supplied to the inside of the top panel 102 of closure shell 106. The molding tool 128 is then caused to descend and be inserted into the shell 106 to mold material 107 into a predetermined shape. It will be readily appreciated with reference to FIGS. 4 and 5 that, in lowering the molding tool 128, the upper region 132 of the sleeve 128c and more specifically the tapered portion 134 and main portion of the upper region 132 are inserted into the closure shell 106 beyond the opening end of the skirt 104 prior to the lower end of the central molding member comprising the center punch 128a and the annular bushing 128b being lowered to a position where they contact the liner material 107 and prior to the lower end of the sleeve 128c being lowered to a position where it faces the annular groove 110 formed in the skirt 104. Some error usually occurs in positioning the closure shell 106 placed on the anvil 126 such that it is misaligned with respect to the tool. When the central axial line of the molding tool 128 is not fully in alignment with the closure shell, the tapered portion 134 and main portion of the upper region of the sleeve 128c successively make contact with the opening end portion of the skirt during the descent of the molding tool 128 from the position shown in FIG. 4 to the position shown in FIG. 5, thereby positioning the closure shell as required with respect to the molding. After this positioning operation has been performed, the molding tool 128 is lowered to the position shown in FIG. 6 thereby molding the liner material 107 into the liner 108 of the desired shape.

The molding tool 128 including the improved external shell positioning sleeve thus act to position the shell accurately with respect to the molding tool 128 by the action of the upper region 132 of the sleeve 128c before the lower end of the molding tool 128 acts on the liner 107. Hence, the liner material 107 is molded accurately into the liner 108 of a desired shape and on the inside of the top panel 102 of the shell. In addition, the closure shell 106 is positioned as required with respect to the molding tool 128 by the action of the upper region 132 of the sleeve 128c before the lower end portion, i.e. the lower region 130, of the sleeve 128c is caused to descend to a position at which it faces the annular groove 110 formed in the skirt of the closure shell 106. Accordingly, the lower end position of the external shell positioning sleeve 128c never abuts on or contacts the annular groove 106 to cause undesirable deformation of the groove.

Furthermore, since only a limited portion of the lower region 130 of the sleeve 128c is decreased in thickness to make the outside diameter $d_1$ of the liner 108 approach the inside diameter $d_2$ of the top panel of the closure shell 106, the strength of the sleeve 128c is maintained and is higher than in the case of decreasing the thicknesses of both the lower region 130 and the upper region 132. Hence, the sleeve 128c does not undergo early wear and tear due to repeated molding operations.

The closure shell 106 shown in FIGS. 4 to 6 is of a special form having pilfer-proof characteristics. It should be understood that the molding tool 128 constructed in accordance with the invention can be applied to other forms of shells having an annular groove in the skirt.

We claim:

1. A molding tool for forming a closure shell liner on the inside surface of a circular top panel of a closure shell where the shell has a cylindrical skirt extending downwardly from the peripheral edge of the top panel and a circumferentially extending annular groove formed on the upper portion of the skirt, and where the tool comprises a central molding member and a shell positioning external sleeve disposed externally of the central molding member; characterized in that said sleeve has an upper portion extending axially downwardly substantially to a point opposite said groove when said tool is inserted into said shell and a lower portion extending axially downwardly from said point to the lower end of said sleeve and wherein the outer diameter of the upper portion of the sleeve exceeds the outer diameter of the lower portion of the sleeve by an amount equal to twice the radial depth of the groove in the skirt.

2. A molding tool according to claim 1 characterized in that a tapered axially extending surface joins the upper portion of the sleeve with the lower portion of the sleeve and in that the outer diameter of the upper portion of the sleeve substantially corresponds to the inside diameter of the open end of the cyclindrical skirt of the shell.

* * * * *